(12) United States Patent
Gerhard et al.

(10) Patent No.: US 6,512,349 B1
(45) Date of Patent: Jan. 28, 2003

(54) METHOD FOR OPERATING A CHARGER FOR A VOLTAGE-MAINTAINING DEVICE, AND AN APPARATUS FOR CARRYING OUT THE METHOD

(75) Inventors: Bilal Gerhard, Niederrohrdorf (CH); John Daniel, Apex, NC (US); Madhav Manjrekar, New Berlin, WI (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 09/928,488

(22) Filed: Aug. 14, 2001

(51) Int. Cl.⁷ .................................................. H02J 7/00
(52) U.S. Cl. ....................................... 320/137; 320/162
(58) Field of Search ............................... 320/137, 162; 323/207; 307/102, 105; 363/95–98

(56) References Cited

U.S. PATENT DOCUMENTS 5,329,222 A 7/1994 Gyugyi et al.

OTHER PUBLICATIONS

"IEEE Transactions on Industrial Electronics, vol. 46, No. 5, Oct. 1999", by Hong–seok Song et al., *Dual Current Control Scheme for PWM Converter Under Unbalanced Input Voltage Conditions*.

*Primary Examiner*—Gregory J. Toatley, Jr.
(74) *Attorney, Agent, or Firm*—Burns, Doane, Swecker & Mathis, L.L.P.

(57) ABSTRACT

A method is specified for operating a charger (1) for a voltage-maintaining device (2), in which a rectifier (5), connected to phase inputs ($P_A$, $P_B$; $P_C$) via a transformer (3) with an electric AC voltage supply system (4), of the charger (1) is driven by means of a drive signal (S) formed from reference charging voltages ($U_{LA,\ ref}$; $U_{LB,\ ref}$; $U_{LC,\ ref}$). Furthermore, a charging voltage ($U_{LA}$; $U_{LB}$; $U_{LC}$) for the corresponding phase (A; B; C) is generated at each phase input ($P_A$; $P_B$; $P_C$) a substantially constant DC voltage ($U_{DC}$) being generated-on the DC voltage side of the rectifier (5). Each charging voltage ($U_{LA}$; $U_{LB}$; $U_{LC}$) is generated in such a way that in the corresponding phase (A; B; C) a charging current ($I_{LA}$; $I_{LB}$; $I_{LC}$) is injected in a fashion substantially proportional to a phase system voltage ($U_{NA}$; $U_{NB}$; $U_{NC}$) of the corresponding phase (A; B; C) of the electric AC voltage supply system (3). An apparatus for carrying out the method is also disclosed.

17 Claims, 3 Drawing Sheets

METHOD FOR OPERATING A CHARGER FOR A VOLTAGE-MAINTAINING DEVICE, AND AN APPARATUS FOR CARRYING OUT THE METHOD

The present invention was made with government support under Agreement No. N00014-99-3-0002 awarded by the Office of Naval Research. The government has license rights in the invention.

DESCRIPTION

1. Technical Field

The present invention relates to the field of power electronics. It concerns a method for operating a charger for a voltage-maintaining device, and an apparatus for carrying out the method in accordance with the preamble of the independent claims.

2. Prior Art

Conventional voltage-maintaining devices are presently mainly in use for compensating voltage dips in the system voltage, as a consequence of short circuits or load changes, in an electric AC voltage supply system. Such a voltage-maintaining device is specified, for example, in U.S. Pat. No. 5,329,22. A storage capacitor is connected therein on the DC voltage side to an inverter which is connected on the AC voltage side to a secondary side of a transformer. The primary side of a transformer is inserted into one of the phases of the electric AC voltage supply system. The inverter is driven in such a way that, in the case of a voltage dip in the system voltage, an input terminal voltage is generated which is an AC voltage. This input terminal voltage serves to compensate the dipped system voltage, the generated input terminal voltage being added to the dipped system voltage such that a phase system voltage present at the phase remains uninfluenced and can therefore be maintained without variation. The electric energy required to generate the input terminal voltage is drawn from the storage capacitor, which must be recharged by means of a charger when energy is drawn, the DC voltage across the storage capacitor requiring to be kept as constant as possible.

A suitable charger for a voltage-maintaining device is disclosed, for example, in "IEEE Transactions on Industrial Electronics, Vol. 46, No. 5, October 1999". There, a rectifier of the charger is connected at its phase inputs to the electric AC voltage supply system via a transformer. Furthermore, a control device is provided which serves to generate reference charging voltages, a drive signal for driving power semiconductor switches of the rectifier being formed from the reference charging voltages by means of a driving circuit connected to the control device. The rectifier generates a charging voltage for the corresponding phase at each phase input by switching the power semiconductor switches in accordance with the drive signal. In addition, on the DC voltage side of the rectifier, the rectifier generates a substantially constant DC voltage, and thereby charges the storage capacitor.

A problem with such an operation of a charger is that although the DC voltage can be kept substantially constant on the DC voltage side of the rectifier upon the occurrence of a voltage dip in one of the phases, a charging current which is increased by comparison with the phases not affected by the voltage dip is drawn in the phase with the voltage dip, in order to charge the storage capacitor. However, this increased charging current additionally loads the phase, in particular the phase system voltage already dipped, and so the phase system voltage, which is already reduced in any case, becomes even lower. In the case of a weak electric AC voltage supply system, this can lead, however, to an insufficient supply of electric energy in the case when an electric load is connected to such an AC voltage supply system, as a result of which the electric load can be damaged or destroyed and/or the electric AC voltage supply system must be turned off as a consequence of the excessively low phase voltage in the affected phase. The high degree of availability required of the electric AC voltage supply system is then no longer obtained.

SUMMARY OF THE INVENTION

It is therefore the object of the invention to specify a method for operating a charger for a voltage-maintaining device, which method generates a charging current of the charger in a phase, affected by the dip in a phase system voltage, of an electric AC voltage supply system, which charging current does not load the reduced phase system voltage in the affected phase, or produces only an insubstantial extra load. Also specified is an apparatus with the aid of which the method can be carried out in a particularly simple way. This object is achieved by means of the features of claims 1 and 10. Advantageous developments of the invention are specified in the subclaims.

In a method according to the invention for operating a charger for a voltage-maintaining device, a rectifier, connected to phase inputs via a transformer with an electric AC voltage supply system, of the charger is driven by means of a drive signal formed from reference charging voltages. Furthermore, a charging voltage for the corresponding phase is generated at each phase input, a substantially constant DC voltage being generated on the DC voltage side of the rectifier. According to the invention, each charging voltage is generated in such a way that in the corresponding phase a charging current is injected in a fashion substantially proportional to a phase system voltage of the corresponding phase of the electric AC voltage supply system. A particularly advantageous result of this is that in the event of a voltage dip in the phase system voltage, the charging current of the charger no longer loads this phase system voltage, or produces only an insubstantial extra load, such that a further reduction or substantial loading of the phase system voltage already reduced by the dip can be successfully avoided. It is thereby possible to ensure adequate supply of electric energy to an electric load connected to a particularly weak electric AC voltage supply system. In addition, the method according to the invention provides a high degree of availability of electric AC voltage supply system, since there is no generation of an increased charging current as is known from the prior art, which could further reduce the already reduced phase system voltage in such a way that the electric AC voltage supply system must be turned off.

The apparatus according to the invention for carrying out the method for operating the charger for a voltage-maintaining device has a control device which serves to generate the reference charging voltages and is connected via a driving circuit for forming the drive signal from the reference charging voltages to the rectifier. According to the invention, the control device comprises a calculating unit for forming the reference charging voltages, to which phase system voltages of the electric Ac voltage supply system are fed on the input side, a phase system voltage being fed respectively to an impedance-matching device of the corresponding phase. Furthermore, the control device comprises a controller unit for generating a reference phase current amplitude value, to which the DC voltage and a DC voltage desired value are fed, the reference phase current amplitude value being fed to each impedance-matching device on the input side. The apparatus according to the invention for carrying out the method for operating the charger for a voltage-maintaining device can therefore be implemented very easily and cost effectively, since the outlay on circuitry can be kept extremely low and, in addition there is a need for only a low number of components for the design. The method according to the invention can therefore be carried out with particular ease by means of this apparatus.

This and further objects, advantages and features of the present invention become evident from the following detailed description of a preferred exemplary embodiment of the invention, in conjunction with the drawing.

Figure 1:
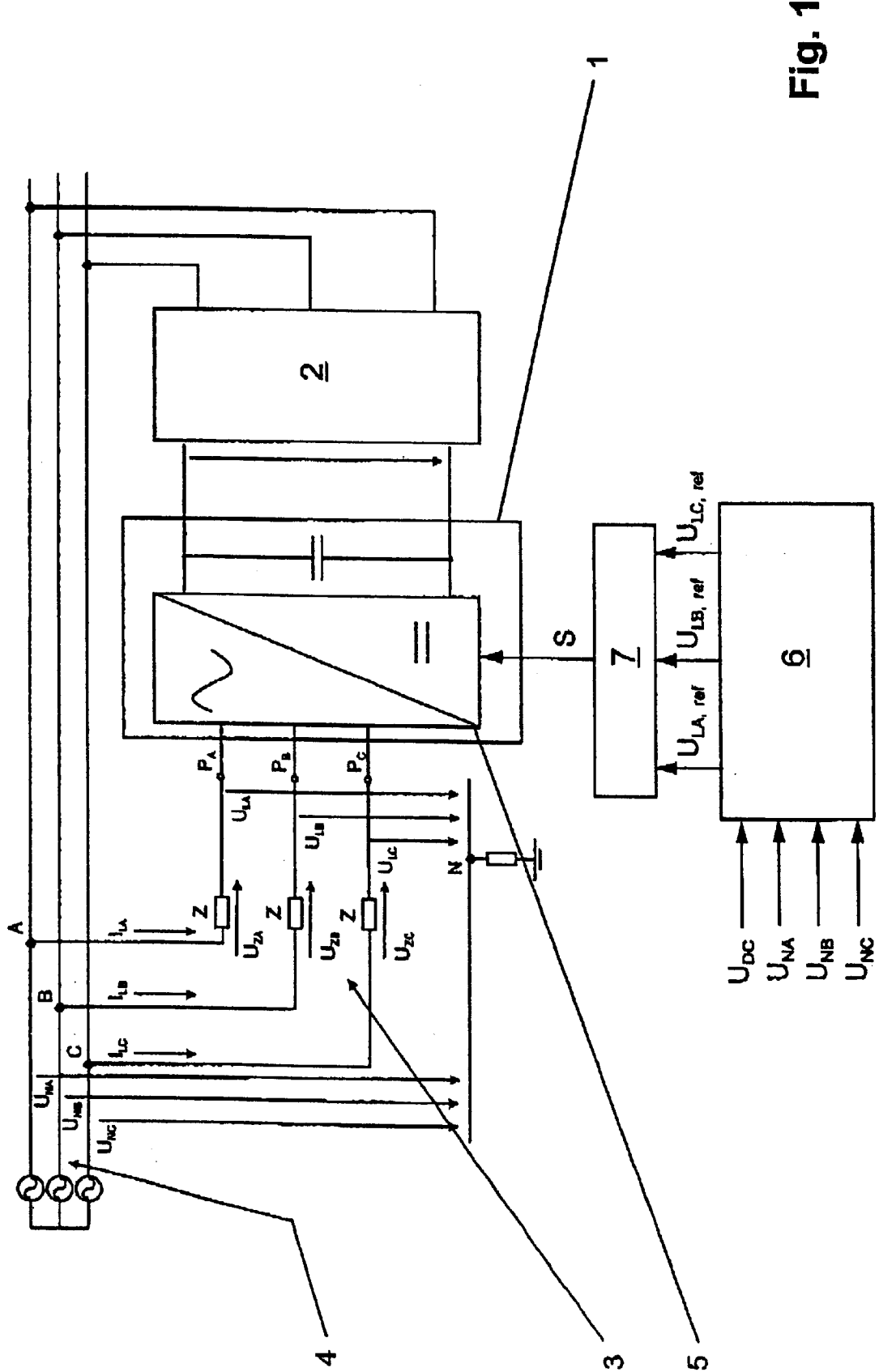
FIG. 1 shows an embodiment of a voltage-maintaining device having an apparatus according to the invention for operating a charger for the voltage-maintaining device.

The reference numerals used in, the drawing, and their meaning are listed in summary in the list of reference numerals. Basically, identical parts in the figures are provided with identical reference numerals. The embodiment described stands by way of example for the subject matter of the invention and imposes no limitations.

WAYS OF IMPLEMENTING THE INVENTION

FIG. 1 shows an embodiment of a voltage-maintaining device 2 having an apparatus according to the invention for operating a charger 1 for the voltage-maintaining device 1. In accordance with FIG. 1, the charger 1 has a rectifier 5 which is connected with its DC voltage side to a storage capacitor. On the AC voltage side of the rectifier 5, that is to say at its phase inputs $P_A$, $P_B$, $P_C$, the rectifier 5 is connected via a transformer 3 to phases A, B, C of an electric AC voltage supply system 4. In accordance with FIG. 1, the transformer is illustrated for each phase A, B, C as an impedance Z which represents the transformer impedance for the corresponding phase A, B, C. Consequently, in accordance with FIG. 1 such an impedance Z is connected to each phase input $P_A$, $P_B$, $P_C$ of the corresponding phase A, B, C. The impedance Z, in particular its impedance absolute value $|Z|$ and its impedance angle $\alpha$ is either given by information from the transformer manufacturer, or can be determined by simple measurement at the transformer 3.

Figure 2:
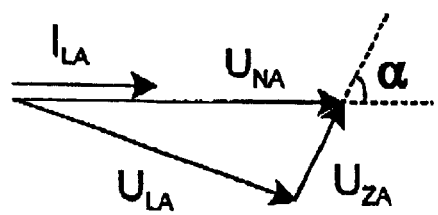
FIG. 2 shows a vector diagram of the voltages relevant to operating the charger.

In the method according to the invention for operating the charger 1 for the voltage-maintaining device 2, the rectifier 5 is driven by means of a drive signal S formed from reference charging voltages $U_{LA, ref}$, $U_{LB, ref}$, $U_{LC, ref}$, in particular power semiconductor switches of the rectifier 5, the result being that a charging voltage $U_{LA}$, $U_{LB}$, $U_{LC}$ for the corresponding phase A, B, C is generated at each phase input $P_A$, $P_B$, $P_C$ against a neutral phase point N, and a substantially constant DC voltage $U_{DC}$ is generated on the DC voltage side of the rectifier 5. Each charging voltage $U_{LA}$, $U_{LB}$, $U_{LC}$ is generated in such a way that in the corresponding phase A, B, C a charging current $I_{LA}$, $I_{LB}$, $I_{LC}$ is injected in a fashion substantially proportional to a phase system voltage $U_{NA}$, $U_{NB}$, $U_{NC}$ of the corresponding phase A, B, C of the electric AC voltage supply system 4. According to FIG. 1 each phase system voltage $U_{NA}$, $U_{NB}$, $U_{NC}$ is applied between the corresponding phase A, B, C and the neutral phase point N. The proportionality of the charging current $I_{LA}$, $I_{LB}$, $I_{LC}$ to the corresponding phase supply voltage $U_{NA}$, $U_{NB}$, $U_{NC}$ relates to the amplitude and the phase angle of the charging current $I_{LA}$, $I_{LB}$, $I_{LC}$, that is to say that in the event of a voltage dip in the phase system voltage $U_{NA}$, $U_{NB}$, $U_{NC}$, the charging current $I_{LA}$, $I_{LB}$, $I_{LC}$ of the corresponding phase A, B, C no longer loads this phase system voltage, or produces only an insubstantial extra load, since this charging current is advantageously reduced in accordance with the phase system voltage $U_{NA}$, $U_{NB}$, $U_{NC}$ reduced by the dip. A further reduction and/or substantial loading of the phase system voltage $U_{NA}$, $U_{NB}$, $U_{NC}$ already reduced by the dip can thereby be avoided successfully. FIG. 2 shows a vector diagram of the voltages relevant to the operation of the charger, only the relevant voltages of the phase A being illustrated. It follows that FIG. 2 shows the abovedescribed proportionality of the charging current $I_{LA}$, $I_{LB}$, $I_{LC}$ only for the relevant voltages of the phase A with the associated charging current $I_{LA}$, these being representative for the other phases B and C. Since, with reference to its phase angle, the charging current $I_{LA}$, $I_{LB}$, $I_{LC}$ is equal in accordance with FIG. 2 to the phase system voltage $U_{NA}$, $U_{NB}$, $U_{NC}$ of the corresponding phase A, B, C, the rectifier 5 advantageously draws only active power. Consequently, there is no loading of the electric AC voltage supply system 4 through drawing of reactive power by the rectifier 5 from one of the phases A, B, C.

We will now look in detail below at the method according to the invention. The reference charging voltage $U_{LA, ref}$, $U_{LB, ref}$, $U_{LC, ref}$ is formed according to the invention from the phase system voltage $U_{NA}$, $U_{NB}$, $U_{NC}$ of the corresponding phase A, B, C, and a reference phase current amplitude value $\hat{I}_{A, B, C, ref}$ generated by correcting the DC voltage $U_{DC}$ to a DC voltage desired value $U_{DC, soll}$. The correction is advantageously performed in accordance with a proportional-integral characteristic. Furthermore, at least one component harmonic with reference to the phase system voltage $U_{NA}$, $U_{NB}$, $U_{NC}$ is filtered out of the DC voltage $U_{DC}$, since such harmonics are generated by the switching of the power semiconductor switches of the rectifier 5 as prompted by the drive signal S, and would prevent a substantially constant profile of the DC voltage $U_{DC}$.

As already described above, the reference charging voltage $U_{LA, ref}$, $U_{LB, ref}$, $U_{LC, ref}$ is formed from the phase system voltage $U_{NA}$, $U_{NB}$, $U_{NC}$ of the corresponding phase A, B, C and the reference phase current amplitude value $\hat{I}_{A, B, C, ref}$. Firstly, for this purpose a phase impedance reference voltage $U_{ZA,ref}$, $U_{ZB,ref}$, $U_{ZB,ref}$ of the corresponding phase A, B, C is formed from the reference phase current amplitude value $\hat{I}_{A, B, C, ref}$ and the phase system voltage $U_{NA}$, $U_{NB}$, $U_{NC}$. Subsequently, the reference charging voltage $U_{LA, ref}$, $U_{LB, ref}$, $U_{LC, ref}$ is formed by subtracting the phase impedance reference voltage $U_{ZA,ref}$, $U_{ZB,ref}$, $U_{ZB,ref}$ from the phase system voltage $U_{NA}$, $U_{NB}$, $U_{NC}$.

The phase impedance reference voltage $U_{ZA,ref}$, $U_{ZB,ref}$, $U_{ZB,ref}$ is, moreover, generated from a phase impedance reference voltage amplitude value $U_{ZA,ref}$, $U_{ZB,ref}$, $U_{ZB,ref}$ of the corresponding phase A, B, C and a normalized phase system voltage $U_{NA, \alpha, nom}$, $U_{NB, \alpha, nom}$, $u_{nc, \alpha, nom}$ of the corresponding phase A, B, C. The abovementioned phase impedance reference voltage amplitude value $\hat{U}_{ZA,ref}$, $\hat{U}_{ZB,ref}$, $\hat{U}_{ZB,ref}$ is formed from the reference phase current amplitude value $\hat{I}_{A, B, C, ref}$ and the impedance absolute value

|Z| of the impedance Z, connected to each phase input $P_A$, $P_B$, $P_C$ of the corresponding phase A, B, C, of the transformer 3. The formation of the phase impedance reference voltage amplitude value $\hat{U}_{ZA,ref}$, $\hat{U}_{ZB,ref}$, $\hat{U}_{ZB,ref}$ is performed in accordance with the formula:

$$\hat{U}_{ZA,ref} = \hat{I}_{A, B, C}|Z|,$$

the phase impedance reference voltage amplitude value $\hat{U}_{ZA,ref}$ being specified for the phase A as representative for the phase impedance reference voltage amplitude values $\hat{U}_{ZB,ref}$, $\hat{U}_{ZB,ref}$ of the phases B and C, which are formed in the same way.

The normalized phase system voltage $U_{NA, \alpha, nom}$, $U_{NB, \alpha, nom}$, $U_{NC, \alpha, nom}$ is, furthermore, formed by dividing a shifted phase system voltage $U_{NA, \alpha}$, $U_{NB, \alpha}$, $U_{NC, \alpha}$ of the corresponding phase A, B, C by a constant phase voltage amplitude value $\hat{U}_{NABC}$ in accordance with the formula $$U_{NA, \alpha, nom} = \frac{U_{NA, \alpha}}{\hat{U}_{NABC}}$$

the normalized phase system voltage $U_{NA, \alpha, nom}$ for the phase A being specified as representative for the normalized phase system voltages $U_{NB, \alpha, nom}$, $U_{NC, \alpha, nom}$ of the phases B and C which are formed in the same way.

The shifted phase system voltage $U_{NA, \alpha}$, $U_{NB, \alpha}$, $U_{NC, \alpha}$ is formed by shifting the phase system voltage $U_{NA}$, $U_{NB}$, $U_{NC}$ by the impedance angle α of the impedance Z, connected to each phase input $P_A$, $P_B$, $P_C$ of the corresponding phase A, B, C, of the transformer. The formation of the shifted phase system voltage $U_{NA, \alpha}$, $U_{NB, \alpha}$, $U_{NC, \alpha}$ is performed in accordance with the formula $$U_{NA, \alpha} = U_{NA} \cdot e^{j\alpha}1$$

the shifted phase system voltage $U_{NA, \alpha}$, $U_{NB, \alpha}$, $U_{NC, \alpha}$ for the phase A being specified as representative for the shifted phase system voltages $U_{BN, \alpha}$, $U_{NC, \alpha}$ of the phases B and C, which are formed in the same way.

Overall, it is thereby possible to use the formation, described above in detail, of the reference charging voltage $U_{LA, ref}$, $U_{LB, ref}$, $U_{LC, ref}$ to generate for each individual phase A, B, C a charging voltage $U_{LA}$, $U_{LB}$, $U_{LC}$ which corresponds to that in the vector diagram in accordance with FIG. 2 such that the charging current $I_{LA}$, $I_{LB}$, $I_{LC}$, which is substantially proportional to the phase system voltage $U_{NA}$, $U_{NB}$, $U_{NC}$ of the corresponding phase A, B, C, is advantageously injected in accordance with FIG. 2.

Figure 3:
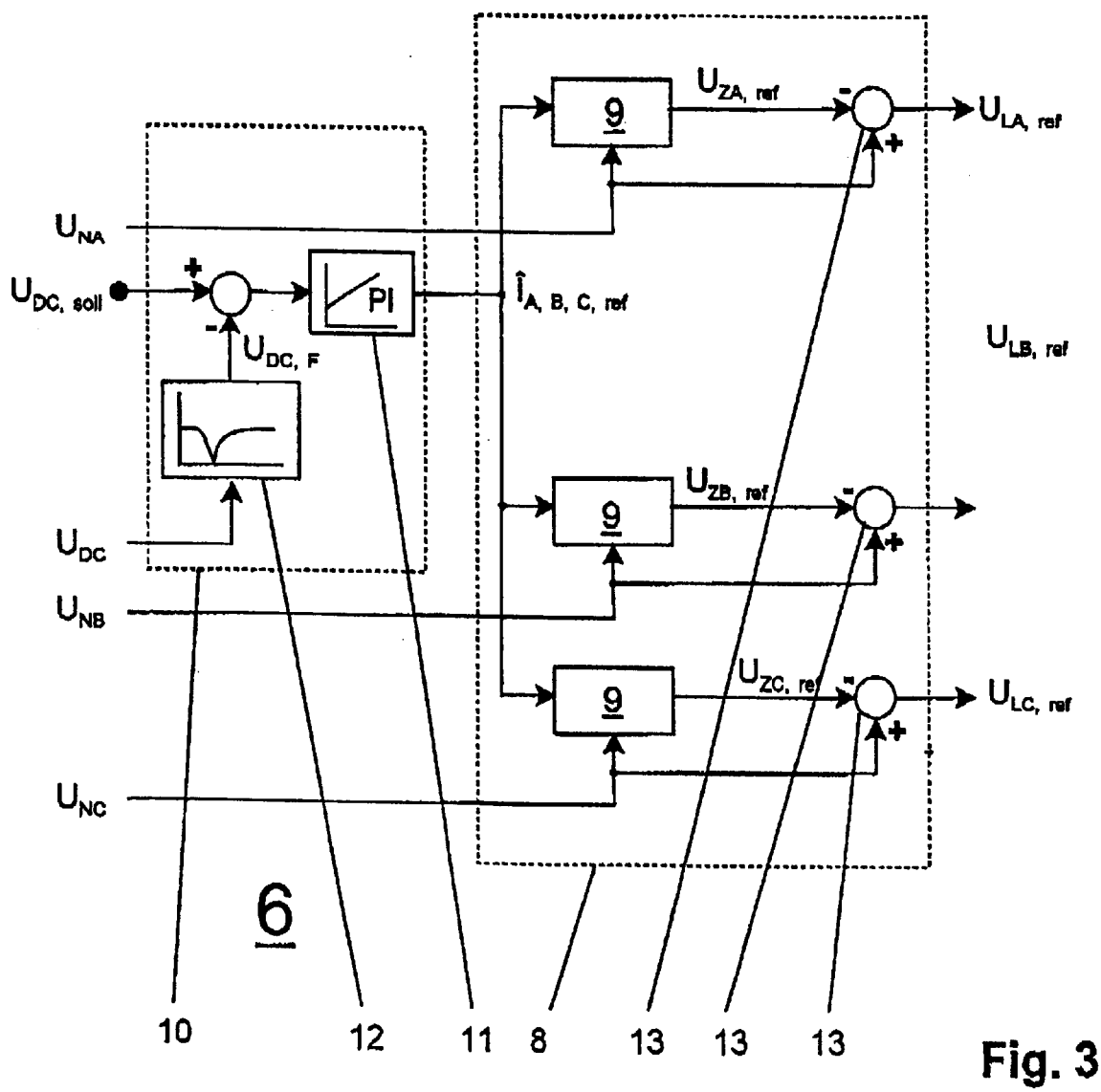
FIG. 3 shows an embodiment of a control device of the apparatus according to the invention, in accordance with FIG. 1.

In accordance with FIG. 1, the apparatus according to the invention for carrying out the previously described method for operating the charger 1 has a control device 6 which serves to generate the reference charging voltages $U_{LA, ref}$, $U_{LB, ref}$, $U_{LC, ref}$ and is connected to the inverter 5 via a driving circuit 7 for forming the drive signal S from the reference charging voltages $U_{LA, ref}$, $U_{LB, ref}$, $U_{LC, ref}$. FIG. 3 shows an embodiment of the control device 6 of the apparatus according to the invention in accordance with FIG. 1, in which the control device 6 comprises according to the invention a calculating unit 8 for forming the reference charging voltages $U_{LA, ref}$, $U_{LB, ref}$, $U_{LC, ref}$. On the input side, this calculating unit 8 is fed the phase system voltages $U_{NA}$, $U_{NB}$, $U_{NC}$ of the electric AC voltage supply system 4, a phase system voltage $U_{NA}$, $U_{NB}$, $U_{NC}$ being fed respectively to an impedence-matching device 9 of the corresponding phase A, B, C. The phase system voltages $U_{NA}$, $U_{NB}$, $U_{NC}$ are measured and tapped at measuring points of the corresponding phases A, B, C, these measuring points not being shown in FIG. 1, for the sake of clarity. Moreover, the control device 6 in accordance with FIG. 3 has a controller unit 10 for generating the reference phase current amplitude value $\hat{I}_{A, B, C, ref}$, to which the DC voltage $U_{DC}$ and a DC voltage desired value $U_{DC, soll}$ are fed. The DC voltage $U_{DC}$ is measured and tapped at measuring points on the storage capacitor, these measuring points not being shown in FIG. 1, for the sake for clarity. The DC voltage desired value $U_{DC, soll}$ can advantageously be prescribed, such that the DC voltage $U_{DC}$ can be corrected by means of such a prescription to any desired value, and can thereby be set. In accordance with FIG. 3, the reference phase current amplitude value $\hat{I}_{A, B, C, ref}$ continues to be fed to each impedance-matching device 9 on the input side.

The controller unit 10 further has a proportional-integral controller 11 having the abovementioned proportional-integral characteristic to which a DC voltage difference signal $U_{DC, diff}$ is fed on the input side. The DC voltage difference signal $U_{DC, diff}$ is formed in accordance with FIG. 3 by means of the DC voltage desired value $U_{DC, soll}$ and a filtered DC voltage value $U_{DC, F}$, the filtered DC voltage value $U_{DC, F}$ being present at the output of a harmonic filter 12. This harmonic filter 12 serves to filter out of the DC voltage $U_{DC}$ at least one component harmonic with reference to the phase system voltage $U_{NA}$, $U_{NB}$, $U_{NC}$, the DC voltage $U_{DC}$ being fed for this purpose on the input side to the harmonic filter. In accordance with FIG. 3, the reference phase current amplitude value $\hat{I}_{A, B, C, ref}$ is present at the output of the controller unit 10, in particular at the output of the proportional-integral controller 11. In accordance with FIG. 3, the phase impedance reference voltage $U_{ZA,ref}$, $U_{ZB,ref}$, $U_{ZB,ref}$ of the corresponding phase A, B, C is present at the output of the impedance-matching device 9. The impedance-matching device 9 is, moreover, connected on the output side in each case to a subtractor 13 serving to form the reference charging voltage $U_{LA, ref}$, $U_{LB, ref}$, $U_{LC, ref}$. Furthermore, the subtractor 13 is fed the phase system voltage $U_{NA}$, $U_{NB}$, $U_{NC}$ of the corresponding phase A, B, C, and forms the reference charging voltage $U_{LA, ref}$, $U_{LB, ref}$, $U_{LC, ref}$ by subtracting the phase impedance reference voltage $U_{ZA,ref}$, $U_{ZB,ref}$ from the corresponding phase system voltage $U_{NA}$, $U_{NB}$, $U_{NC}$.

Figure 4:
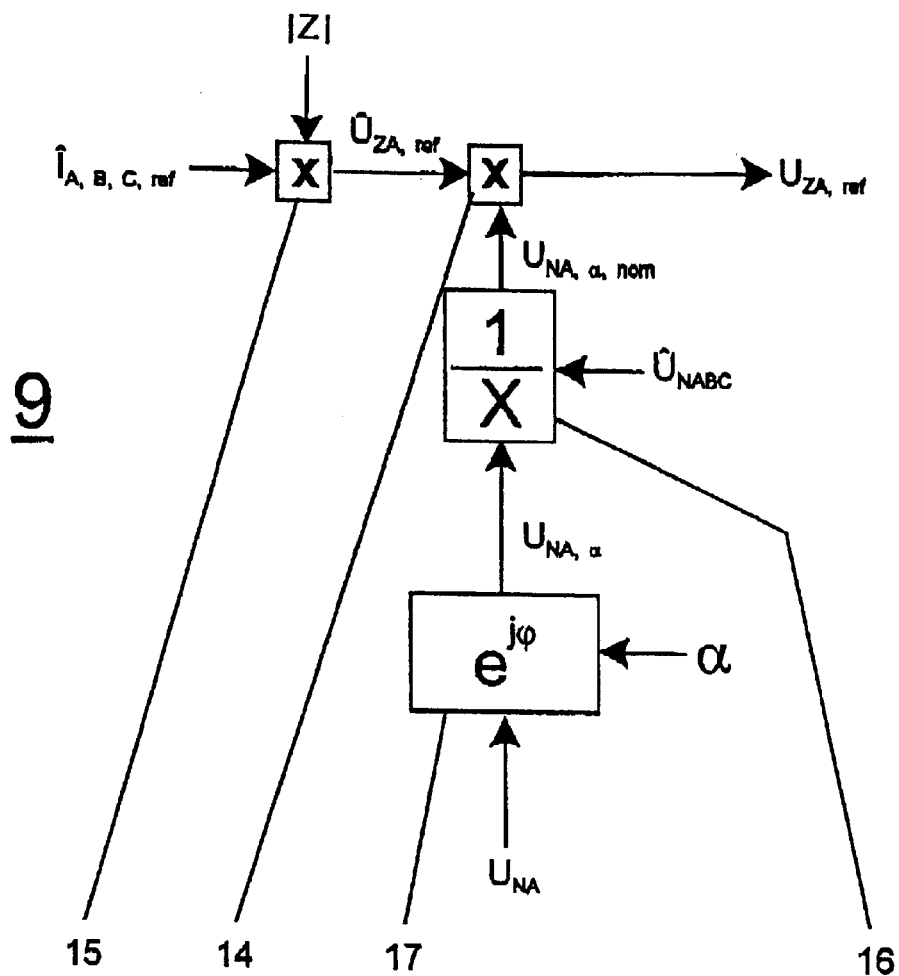
FIG. 4 shows an embodiment of an impedance-matching device of the control device according to FIG. 3.

An embodiment of the impedance-matching device 9 of the control device 6 according to FIG. 3 is illustrated in FIG. 4. The embodiment of the impedance-matching device 9 shown in FIG. 4 is illustrated only for the phase A with the corresponding variables and/or designations, and is representative for the impedance-matching device 9 in accordance with FIG. 3 of the phases B and C, which are formed in the same way. In accordance with FIG. 4, the impedance-matching device 9 has a first multiplier 14 for generating the phase impedance reference voltage $U_{ZA,ref}$, $U_{ZB,ref}$, $U_{ZB,ref}$ to which the phase impedance reference voltage amplitude value $\hat{U}_{ZA,ref}$, $\hat{U}_{ZB,ref}$, $\hat{U}_{ZB,ref}$ of the corresponding phase A, B, C and the normalized phase system voltage $U_{NA, \alpha, nom}$, $U_{NB, \alpha, nom}$, $U_{NC, \alpha, nom}$ of the corresponding phase A, B, C are fed. The impedance matching device 9 also comprises a second multiplier 15, which serves to form the phase impedance reference voltage amplitude value $\hat{U}_{ZA,ref}$, $\hat{U}_{ZB,ref}$, $\hat{U}_{ZB,ref}$, and to which for this purpose the reference phase current amplitude value $\hat{I}_{A, B, C, ref}$ and the impedance absolute value |Z| are fed. The formation of the phase impedance reference voltage amplitude value $\hat{U}_{ZA,ref}$, $\hat{U}_{ZB,ref}$, $\hat{U}_{ZB,ref}$ is performed in accordance with the formula already specified above.

In order to form the normalized phase system voltage $U_{NA, \alpha nom}$, $U_{NB, \alpha, nom}$, $U_{NC, \alpha, nom}$, a normalizer 16 of the impedance-matching device 9 is provided to which, in accordance with FIG. 4, the constant phase voltage amplitude value $\hat{U}_{NABC}$ and the shifted phase system voltage $U_{NA,\alpha}$, $U_{NB,\alpha}$, $U_{NC,\alpha}$ of the corresponding phase A, B, C are fed. The generation of the normalized phase system voltage $U_{NA,\alpha,nom}$, $U_{NB,\alpha,nom}$, $U_{NC,\alpha,nom}$ is performed. in accordance with the formula already specified above. In addition, there is provided in the impedance-matching device 9 a phase shifter 17 for generating the shifted phase system voltage $U_{NA,\alpha}$, $U_{NB,\alpha}$, $U_{NC,\alpha}$, to which the phase system voltage $U_{NA}$, $U_{NB}$, $U_{NC}$ of the corresponding phase A, B, C and the impedance angle α are fed, the generation of the shifted phase system voltage $U_{NA,\alpha}$, $U_{NB,\alpha}$, $U_{NC,\alpha}$ being performed according to the formula already mentioned above.

The apparatus according to the invention is distinguished overall by a very simple and cost-effective design, since the outlay on circuitry is extremely low and, in addition, only a small number of components are required for the design. Consequently, the method according to the invention for operating the charger 1 for the voltage-maintaining device 2 can be executed in a particularly simple way with the aid of the apparatus according to the invention.

It goes without saying that the person skilled in the art can use to the same effect blocks, units and signals other than those specified in the exemplary embodiment.

| List of reference numerals | |
|---|---|
| 1 | Charger |
| 2 | Voltage-maintaining device |
| 3 | Transformer |
| 4 | Electric AC voltage supply system |
| 5 | Rectifier |
| 6 | Control device |
| 7 | Driving circuit |
| 8 | Calculating unit |
| 9 | Impedance-matching device |
| 10 | Controller unit |
| 11 | Proportional-integral controller |
| 12 | Harmonic filter |
| 13 | Subtractor |
| 14 | First multiplier |
| 15 | Second multiplier |
| 16 | Normalizer |
| 17 | Phase shifter |

What is claimed is:

1. A method for operating a charger (1) for a voltage-maintaining device (2), in which a rectifier (5), connected to phase inputs ($P_A$; $P_B$; $P_C$) via a transformer (3) with an electric AC voltage supply system (4), of the charger (1) is driven by means of a drive signal (S) formed from reference charging voltages ($U_{LA,ref}$; $U_{LB,ref}$; $U_{LC,ref}$) a charging voltage ($U_{LA}$; $U_{LB}$; $U_{LC}$) for the corresponding phase (A; B; C) being generated at each phase input ($P_A$; $P_B$; $P_C$), and a substantially constant DC voltage ($U_{DC}$) being generated on the DC voltage side of the rectifier (5), characterized in that each charging voltage ($U_{LA}$; $U_{LB}$;. $U_{LC}$) is generated in such a way that in the corresponding phase (A; B; C) a charging current ($I_{LA}$; $I_{LB}$; $I_{LC}$) is injected in a fashion substantially proportional to a phase system voltage ($U_{NA}$, $U_{NB}$; $U_{NC}$) of the corresponding phase (A; B; C) of the electric AC voltage supply system (4).

2. The method as claimed in claim 1, characterized in that the reference charging voltage ($U_{LA,ref}$; $U_{LB,ref}$; $U_{LC,ref}$) is formed from the phase system voltage ($U_{NA}$; $U_{NB}$; $U_{NC}$) of the corresponding phase (A; B; C), and a reference phase current amplitude value ($\hat{I}_{A,B,C,ref}$) generated by correcting the DC voltage ($U_{DC}$) to a DC voltage desired value ($U_{DC,soll}$).

3. The method as claimed in claim 2, characterized in that the correction is performed in accordance with a proportional-integral characteristic.

4. The method as claimed in claim 2, characterized in that at least one component harmonic with reference to the phase system voltage ($U_{NA}$; $U_{NB}$; $UN_{NC}$) is filtered out of the DC voltage ($U_{DC}$).

5. The method as claimed in claim 2, characterized in that a phase impedance reference voltage ($U_{ZA,ref}$; $U_{ZB,ref}$; $U_{ZB,ref}$) of the corresponding phase (A; B; C) is formed from the reference phase current amplitude value ($\hat{I}_{A,B,C,ref}$) and the phase system voltage ($U_{NA}$; $U_{NB}$; $U_{NC}$), and in that the reference charging voltage ($U_{LA,ref}$; $U_{LB,ref}$; $U_{LC,ref}$) is formed by subtracting the phase impedance reference voltage ($U_{ZA,ref}$; $U_{ZB,ref}$; $U_{2C,ref}$) from the phase system voltage ($U_{NA}$; $U_{NB}$; $U_{NC}$).

6. The method as claimed in claim 5, characterized in that the phase impedance reference voltage ($U_{ZA,ref}$; $U_{ZB,ref}$; $U_{ZB,ref}$) is generated from a phase impedance reference voltage amplitude value ($\hat{U}_{ZA,ref}$; $\hat{U}_{ZB,ref}$; $\hat{U}_{ZB,ref}$) of the corresponding phase (A; B; C) and a normalized phase system voltage ($U_{NA,\alpha,nom}$; $U_{NB,\alpha,nom}$; $U_{NC,\alpha,nom}$) of the corresponding phase (A; B; C).

7. The method as claimed in claim 6, characterized in that the phase impedance reference voltage amplitude value. ($\hat{U}_{ZA,ref}$; $\hat{U}_{ZB,ref}$; $\hat{U}_{ZB,ref}$) is formed from the reference phase current amplitude value ($\hat{I}_{A,B,C,ref}$) and an impedance absolute value ($|Z|$) of an impedance (Z), connected to each phase input ($P_A$; $P_B$; $P_C$) of the corresponding phase (A; B; C), of the transformer (3).

8. The method as claimed in claim 6, characterized in that the normalized phase system voltage ($U_{NA,\alpha,nom}$; $U_{NB,\alpha,nom}$; $U_{NC,\alpha,nom}$) is formed by means of dividing a shifted phase system voltage ($U_{NA,\alpha}$; $U_{NB,\alpha}$; $U_{NC,\alpha}$) of the corresponding phase (A; B; C) by a constant phase voltage amplitude value ($\hat{U}_{NABC}$).

9. The method as claimed in claim 8, characterized in that the shifted phase system voltage ($U_{NA,\alpha}$; $U_{NB,\alpha}$; $U_{NC,\alpha}$) is formed by shifting the phase system voltage ($U_{NA}$; $U_{NB}$; $U_{NC}$) by an impedance angle (α) of an impedance (Z), connected to each phase input ($P_A$; $P_B$; $P_C$) of the corresponding phase (A; B; C), of the transformer (3).

10. An apparatus for carrying out a method for operating a charger (1) for a voltage-maintaining device (2), having a control device (6) which serves to generate reference charging voltages ($U_{LA,ref}$; $U_{LB,ref}$; $U_{LC,ref}$) and is connected via a driving circuit (7) for forming a drive signal (S) from the reference charging voltages ($U_{LA,ref}$; $U_{LB,ref}$; $U_{LC,ref}$) to a rectifier (5) of the charger (1), the rectifier (5) generating at each phase input ($P_A$; $P_B$; $P_C$) a charging voltage ($U_{LA}$; $U_{LB}$; $U_{LC}$) for the corresponding phase (A; B; C), and being connected to the phase inputs ($P_A$; $P_B$; $P_C$) via a transformer (3) with an electric AC voltage supply system (4) and generating a substantially constant DC voltage ($U_{DC}$) on its DC voltage side, characterized in that the control device (6) comprises a calculating unit (8) for forming the reference charging voltages ($U_{LA,ref}$; $U_{LB,ref}$; $U_{LC,ref}$), to which phase system voltages ($U_{NA}$; $U_{NB}$; $U_{NC}$) of the electric AC voltage supply system (4) are fed on the input side, a phase system voltage ($U_{NA}$; $U_{NB}$; $U_{NC}$) being fed respectively to an impedance-matching device (9) of the corresponding phase (A; B; C), and a controller unit (10) for generating a reference phase current amplitude value ($\hat{I}_{A,B,C,ref}$), to which the DC voltage ($U_{DC}$) and a DC voltage desired value ($U_{DC,soll}$) are fed, the reference phase current amplitude value ($\hat{I}_{A,B,C,ref}$) being fed to each impedance-matching device (9) on the input side.

11. The apparatus as claimed in claim 10, characterized in that the controller unit (10) has a proportional-integral controller (11) to which a DC voltage difference signal ($U_{DC,\ diff}$), which is formed by means of the DC voltage desired value ($U_{DC,\ soll}$) and a filtered DC voltage value ($U_{DC,\ F}$), is fed on the input side, and the reference phase current amplitude value ($\hat{I}_{A,\ B,\ C,\ ref}$) is present on the output side.

12. The apparatus as claimed in claim 11, characterized in that the controller unit (10) has a harmonic filter (12) for filtering out of the DC voltage ($U_{DC}$) at least one component harmonic with reference to the phase system voltage ($U_{NA}$; $U_{NB}$; $U_{NC}$), the DC voltage ($U_{DC}$) being fed to the harmonic filter (12) on the input side, and the filtered DC voltage value ($U_{DC,F}$) being present on the output side.

13. The apparatus as claimed in claim 10, characterized in that present at the output of the impedance-matching device (9) is a phase impedance reference voltage ($U_{ZA,ref}$; $U_{ZB,ref}$; $U_{ZB,\ ref}$) of the corresponding phase (A; B; C), and each impedance-matching device (9) is connected on the output side in each case to a subtractor (13) serving to form the reference charging voltage ($U_{LA,ref}$, $U_{LB,ref}$, $U_{LC,ref}$) and to which the phase system voltage ($U_{NA}$; $U_{NB}$; $U_{NC}$) of the corresponding phase (A; B; C) is fed.

14. The apparatus as claimed in claim 13, characterized in that the impedance-matching device (9) has a first multiplier (14) for generating the phase impedance reference voltage ($U_{ZA,ref}$; $U_{ZB,ref}$; $U_{ZB,ref}$), to which a phase impedance reference voltage amplitude value ($\hat{U}_{ZA,ref}$; $\hat{U}_{ZB,ref}$; $\hat{U}_{ZB,ref}$) of the corresponding phase (A; B; C), and a normalized phase system voltage ($U_{NA,\ \alpha,\ nom}$; $U_{NB,\ \alpha,\ nom}$; $U_{NC,\ \alpha,\ nom}$) of the corresponding phase (A; B; C) are fed.

15. The apparatus as claimed in claim 14, characterized in that the impedance-matching device (9) has a second multiplier (15) for forming the phase impedance reference voltage amplitude value ($\hat{U}_{ZA,ref}$; $\hat{U}_{ZB,ref}$; $\hat{U}_{ZB,ref}$), to which the reference phase current amplitude value ($\hat{I}_{A,\ B,\ C,\ ref}$) and an impedance absolute value ($|Z|$) are fed to an impedance (Z), connected to each phase input ($P_A$; $P_B$; $P_C$) of the corresponding phase (A; B; C), of the transformer (3).

16. The apparatus as claimed in claim 14, characterized in that the impedance-matching device (9) has a normalizer (16) for forming the normalized phase system voltage ($U_{NA,\ \alpha,\ nom}$; $U_{NB,\ \alpha,\ nom}$; $U_{NC,\ \alpha,\ nom}$), to which a constant phase voltage amplitude value ($\hat{U}_{NABC}$) and a shifted phase system voltage ($U_{NA,\ \alpha}$; $U_{NB,\ \alpha}$; $U_{NC,\ \alpha}$) of the corresponding phase (A; B; C) are fed.

17. The apparatus as claimed in claim 16, characterized in that the impedance-matching device (9) has a phase shifter (17) for forming the shifted phase system voltage ($U_{NA,\ \alpha}$; $U_{NB,\ \alpha}$; $U_{NC,\ \alpha}$), to which the phase system voltage ($U_{NA}$; $U_{NB}$; $U_{NC}$) of the corresponding phase (A; B; C), and an impedance angle ($\alpha$) of an impedance (Z), connected to each phase input ($P_A$; $P_B$; $P_C$) of the corresponding phase (A; B; C), of the transformer (3) are fed.

* * * * *